US005754831A

United States Patent [19]

Berman

[11] Patent Number: 5,754,831
[45] Date of Patent: May 19, 1998

[54] SYSTEMS AND METHODS FOR MODELING A NETWORK

[75] Inventor: Jeremy S. Berman, St. Louis Park, Minn.

[73] Assignee: NCR Corporation, Dayton, Ohio

[21] Appl. No.: 656,122

[22] Filed: May 30, 1996

[51] Int. Cl.[6] .................................................. G06F 9/455
[52] U.S. Cl. ............... 395/500; 395/200.11; 395/200.18; 395/200.2; 364/578; 370/230
[58] Field of Search ...................... 395/500, 842, 395/183.01, 280, 200.01, 200.1, 200.11, 200.18, 200.2, 874, 920; 371/20.1, 5.1; 364/200 MS File, 578; 370/94.1, 230

[56] References Cited

U.S. PATENT DOCUMENTS

| 4,777,595 | 10/1988 | Strecker et al. | 364/200 |
|---|---|---|---|
| 4,916,647 | 4/1990 | Catlin | 364/578 |
| 5,325,361 | 6/1994 | Lederer et al. | 370/94.1 |
| 5,440,719 | 8/1995 | Hanes et al. | 395/500 |
| 5,481,548 | 1/1996 | Wallace | 371/20.1 |
| 5,485,584 | 1/1996 | Hausman et al. | 395/842 |
| 5,528,748 | 6/1996 | Wallace | 395/183.01 |
| 5,548,731 | 8/1996 | Chang et al. | 395/280 |
| 5,598,532 | 1/1997 | Liron | 395/200.01 |
| 5,627,829 | 5/1997 | Gleeson et al. | 370/230 |

OTHER PUBLICATIONS

"Design and Evaluation of an Adaptive Flow Control Scheme", by A. Agrawala and D. Sanghi, IEEE INFOCOM '92, Jun. 1992, pp. 2391-2397.

"Scheduling Variable-Length Messages in a Single-Hop Multichannel Local Lightwave Network", by F. Jia et al., IEEE/ACM Transactions on Networking, vol. 3, no. 4, Aug. 1995, pp. 477-488.

"A Multimedia Synchronization Model and Its Implementation in Transport Protocols", by C. Yang et al., IEEE Journal on Selected Areas in Communications, vol. 14, No. 1, Jan. 1996, pp. 212-225.

Primary Examiner—Kevin J. Teska
Assistant Examiner—Russell W. Frejd
Attorney, Agent, or Firm—William A. Munck

[57] ABSTRACT

The present invention is directed, in general, to network design, and more specifically, to systems and methods for modeling a network. The present invention provides a method of modeling a network and a computer system employing the method. The processing system includes a memory for storing tasks and a processing circuit, associated with the memory, for executing ones of the tasks A set of associated data records, which is storable in the memory, is included. The set of associated data records represents a plurality of network elements within a network model. The associated data records include one or more parameters representing characteristics of the network elements within the network model. A modeling task, storable in said memory and executable by the processing circuit, simulates transmission of data packets between ones of the network elements within the network model. The simulated transmission of the data packets within the network model is performed, at least in part, as a function of the one or more parameters. A processing task, storable in the memory and executable by the processing circuit, generates transmission indicia of the network elements within the network model. The transmission indicia is generated as a function of the simulated transmission of the data packets within the network model, and is usable by the processing task to modify ones of the one or more parameters. This modification suitably simplifies the simulated transmission of the data packets within the network model by the modeling task.

27 Claims, 4 Drawing Sheets

SYSTEMS AND METHODS FOR MODELING A NETWORK

CROSS-REFERENCE TO A RELATED APPLICATION

The present invention is related to U.S. patent application Ser. No. 08/641,599, entitled "SYSTEMS AND METHODS FOR GENERATING AND DISPLAYING A SYMBOLIC REPRESENTATION OF A NETWORK MODEL," commonly assigned to the assignee of the present invention, and filed May 1, 1996. The disclosure of this related application is incorporated herein by reference.

TECHNICAL FIELD OF THE INVENTION

The present invention is directed, in general, to network design, and more specifically, to systems and methods for modeling a network.

BACKGROUND OF THE INVENTION

In designing or upgrading a communications network, a network designer must consider and analyze a large number of alternative network configurations. The possible number of combinations of link speeds, node placements, and other parameters can easily be in the hundreds, if not thousands. The designer's goal is to find the network configuration that best fits a set of performance requirements, and accomplishes the same within a given budget. Fortunately, network modeling tools exist that enable a designer to examine alternative network configurations.

Conventional network modeling tools are of two general types, "mathematical" and "simulation." Mathematical modeling tools predict the utilization and response times of various network components. They tend to be extremely fast, and quite useful for computing initial, but rough, estimates for network evaluations. They are typically well suited to examine large numbers of alternative network configurations and to eliminate from consideration those configurations that fail to meet some threshold or minimum network specifications. For precision of results, however, mathematical models cannot compete with simulation modeling tools.

Simulation modeling tools simulate transmission of thousands, if not hundreds of thousands, of messages passing through the nodes, links and gateways of a network. The model simulates the messages competing for network resources and joining system queues when resources are busy. Network resource utilizations and transaction response times are monitored and are often presented to the user in the form of statistical reports of varying complexity. Network simulation models are well suited for in-depth examination of a small number of network configurations, however, due to their substantial execution times, simulation modeling tools are not at all well suited, and are impracticable for analyzing a large number of network configurations, a task easily handled by conventional mathematical modeling tools. The mathematical model, however, is far less accurate than the simulation model.

The conventional approach is to run the mathematical and simulation modeling tools sequentially. Under this approach, the user uses two substantially different modeling tools—a mathematical modeling tool to reduce the set of alternative network configurations and a simulation modeling tool to evaluate the reduced set of configurations. The user is often required to master two models. When defining the network attributes to be modeled, the user, in general, must carefully verify that the same network attributes were defined for both the mathematical and simulation, network modeling tools. In addition, the user may also have to become familiar with two different network modeling performance report formats.

To address a number of the above-identified concerns, an integrated interface has been developed that enables the user to use a single common interface to interact with both the mathematical and simulation modeling tools. In other words, the integrated interface solution maintains two modes of operation, namely, mathematical and simulation, however, each mode shares a common user interface. By employing the common user interface for both modes of operation, the user is required to define the attributes of the network model only once. This increases the efficiency of operation and assures that both modes, mathematical and simulation, are analyzing the same network configuration under the same assumptions.

The common interface solution, as well as the separate modeling approaches, fail to provide a single network modeling tool that optimizes both the simulated operation and mathematical analysis of a network configuration. There accordingly exists a need in the art for an integrated network modeling tool that combines the quickness of the mathematical model with the authenticity of the simulation model. The inability of conventional solutions to integrate the preferred aspects of the mathematical model and the simulation model remain a dominant obstacle to producing cost-effective and more commercially desirable products.

SUMMARY OF THE INVENTION

To overcome the above-detailed disadvantages and shortcomings of the prior art, it is an object of the present invention to provide a means by which a user may simplify modeling and testing of a network of associated, or interconnected, network elements (e.g., nodes, links, routers, bridges, gateways, switches, local area networks, etc.). In the attainment of the same, a set of components for each one of the network elements is determined by calculation as a function of at least one of (1) a set of parameters associated with the network elements, and (2) a set of parameters associated with a message to be transmitted through the network. The set of components may suitably include at least a queuing delay. A simulated transmission of the message through the network is modified as a function of the set of components. The simulated transmission generates a response time for transmitting the message through the network.

The present invention provides an exemplary method for modeling a network and an exemplary processing system employing the same. The method comprises the steps of: (1) storing a set of associated data records in a memory, the set of associated data records representing network elements within a network model, the associated data records including one or more parameters representing characteristics of the network elements within the network model, (2) simulating transmission of data packets between ones of the network elements within the network model, the simulated transmission of the data packets within the network model is performed, at least in part, as a function of the one or more parameters and (3) generating transmission indicia of the network elements within the network model, the transmission indicia generated as a function of the simulated transmission of the data packets within the network model, the transmission indicia usable to modify ones of the one or more parameters to thereby simplify the simulated transmission of the data packets within the network model.

In an alternate embodiment, associated ones of the data packets form a message and the method further includes the steps of (1) segmenting the message into data packets, and optionally, (2) determining a transmission time for transmitting the message within the network model. In a further alternate embodiment, if the transmission indicia includes a transmission time associated with the simulated transmission of the data packets within the network model, the method includes the step of updating a utilization accumulator as a function of the transmission time. In a still further alternate embodiment, associated ones of the data packets form a plurality of messages and the method further includes the step of determining network processing data, at least in part, as a function of simulating transmission of the plurality of messages within the network model. In another alternate embodiment, the method further includes the steps of: (1) associating multiplicity indicia with ones of the associated data records, the multiplicity indicia providing an abbreviated expression of quantities of the network elements within the network model, and (2) using the multiplicity indicia to display a symbolic representation of the network model on a display device.

A preferred embodiment of using and distributing the present invention is as software. The software embodiment includes a plurality of instructions stored to a conventional storage medium. The instructions are readable and executable by a suitable processing circuit. The instructions, upon execution, operate to direct the processing circuit to model transmission of data packets among ones of a plurality of network elements in accordance with the principles of the present invention. Preferred storage media include, without limitation, magnetic, optic, and semi-conductor, as well as suitable combinations thereof.

The preferred processing system includes (1) a memory for storing a plurality of tasks, and (2) a processing circuit, associated with the memory, for executing ones of the tasks. The processing system includes a set of associated data records that are storable in the memory and that represent network elements within a network model. The associated data records include one or more parameters representing characteristics of the network elements within the network model.

The processing system further includes a modeling task and a processing task. The modeling task is storable in the memory and executable by the processing circuit to simulate transmission of data packets between ones of the network elements within the network model. The simulated transmission of the data packets within the network model is performed, at least in part, as a function of the one or more parameters. The processing task is storable in the memory and executable by the processing circuit to generate transmission indicia of the network elements within the network model. The transmission indicia is generated as a function of the simulated transmission of the data packets within the network model. The transmission indicia is usable by the processing task to modify ones of the one or more parameters to thereby simplify the simulated transmission of the data packets within the network model by the modeling task.

In an alternate embodiment, associated ones of the data packets form a message and the modeling task further directs the processing circuit to determine a transmission time for transmitting the message within the network model. In another alternate embodiment, the modeling task further directs the processing circuit to segment a message into the data packets, to process the same, and to combine the data packets to reform the message. In a further alternate embodiment, the transmission indicia may suitably include a transmission time associated with the simulated transmission of the data packets within the network model, and the processing task may further direct the processing circuit to update a utilization accumulator as a function of the transmission time. In a still further alternate embodiment, associated ones of the data packets may form a plurality of messages and the modeling task may further direct the processing circuit to determine network processing data, which may suitably be determined, at least in part, as a function of simulating transmission of the plurality of messages within the network model. In another alternate embodiment, ones of the parameters represent a queuing delay associated with ones of the network elements within the network model.

An important aspect of the present invention is that the principles of the same may suitably be implemented in hardware, firmware or software.

The foregoing has outlined rather broadly a number of features and technical advantages of the present invention so that those skilled in the art may better understand the Detailed Description of the Invention that follows. Additional features and advantages of the invention will be described hereinafter that, in conjunction with the foregoing, form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings in which like numbers designate like parts, and in which.

DETAILED DESCRIPTION

Figure 1:
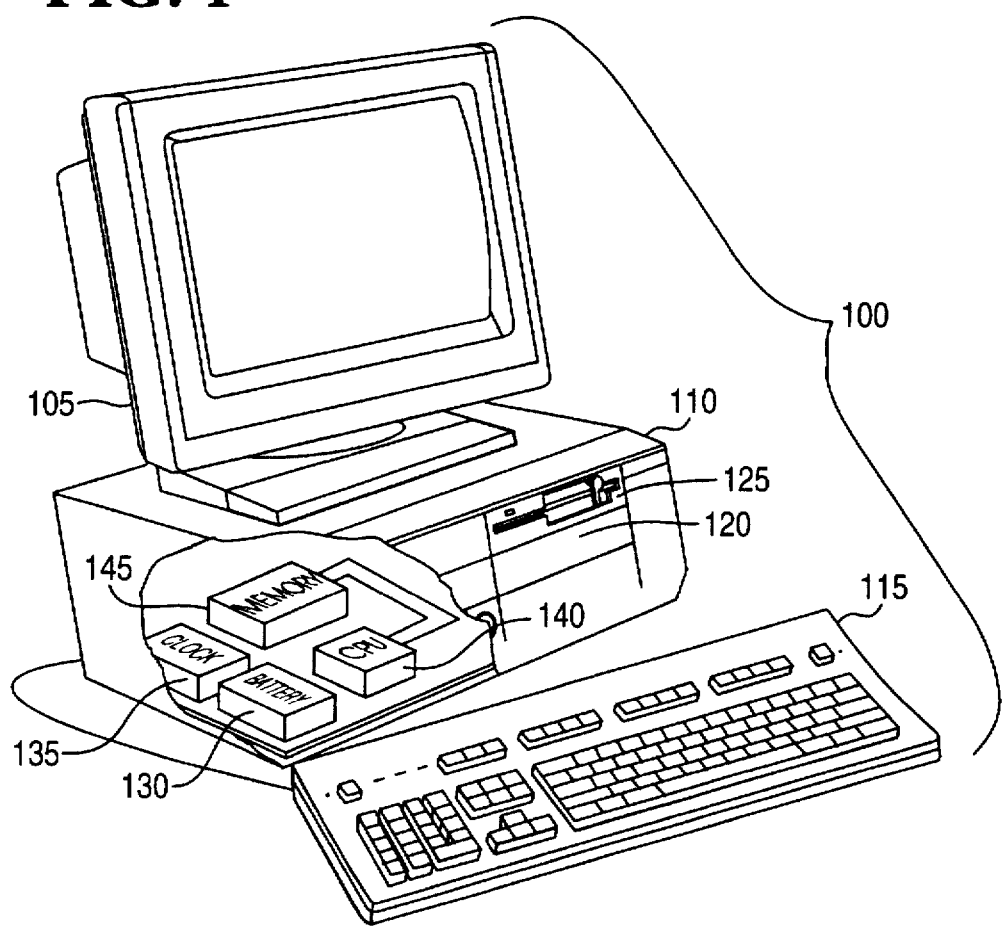
FIG. 1 illustrates an isometric view of an exemplary processing system.

FIG. 1 illustrates an isometric view of an exemplary processing system 100. Processing system 100 is capable of being programmed in accordance with the principles of the present invention. Exemplary processing system 100 includes a monitor 105, a housing 110 and a keyboard 115. "Include," as the term is used herein, means to include without limitation. Housing 110 includes a hard disk drive 120 and a floppy disk drive 125. Hard disk drive 120 is suitable to provide fast access storage and retrieval. Floppy disk drive 125 is operative to receive, read or write to external disks, and may suitably be replaced by or combined with other conventional structures for transferring data or instructions, including tape and compact disc drives, telephony systems and devices (including telephone, video phone, facsimile or the like), network communication ports and the like. "Or," as the term is used herein, means and/or.

Housing 110 is partially cut-away to illustrate a battery 130, a clock 135, a processor 140 and a detached local memory 145, all of which are suitably housed therein. Processing system 100 may suitably include a set of associated data records, a modeling task and a processing task, all of which are stored in detached local memory 145 or hard disk drive 120. The set of associated data records represent network elements within a suitable network model. The associated data records include one or more parameters representing characteristics of the network elements within the network model. A preferred method for defining the network elements and interrelating the same to create the set of associated data records is discussed in detail in U.S. patent application Ser. No. 08/641,599, entitled "SYSTEMS AND METHODS FOR GENERATING AND DISPLAYING A SYMBOLIC REPRESENTATION OF A NETWORK MODEL," which was incorporated herein by reference above.

In a preferred embodiment, a set of message records may also suitably be stored in memory. The set of message records representing characteristics of one or more messages for simulating transmission of the same through the network model.

The modeling task, which is suitably retrievable and executable by processor 140, is operative to simulate transmission of data packets between ones of the network elements within the network model. The simulated transmission of the data packets within the network model may suitably be performed, at least in part, as a function of the one or more parameters, and, possibly as a further function of at least a subset of the set of message records The processing task, which is suitably retrievable and executable by processor 140, is operative to generate transmission indicia of the network elements within the network model. The transmission indicia is generated, at least in part, as a function of the simulated transmission of the data packets within the network model. The transmission indicia may suitably be usable by the processing task to modify ones of the one or more parameters, thereby simplifying the simulated transmission of the data packets within the network model by the modeling task.

Although processing system 100 is illustrated having a single processor, a single hard disk drive and a single local memory, processing system 100 may suitably be equipped with any multitude or combination of processors or storage devices. Processing system 100 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Exemplary keyboard 115 may suitably provide a user interface that is associated with processor 140 and is operative to generate control signals. The control signals are usable for controlling the aforementioned tasks. Although keyboard 115 is shown, any suitable conventional apparatus or device for receiving user input and generating control signals may replace, or be used in conjunction with, keyboard 115.

Conventional processing system architecture is more fully discussed in *Computer Organization and Architecture*, by William Stallings, MacMillan Publishing Co. (3rd ed. 1993);

conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2nd ed. 1992). Each of the foregoing publications is incorporated herein by reference.

Figure 2:
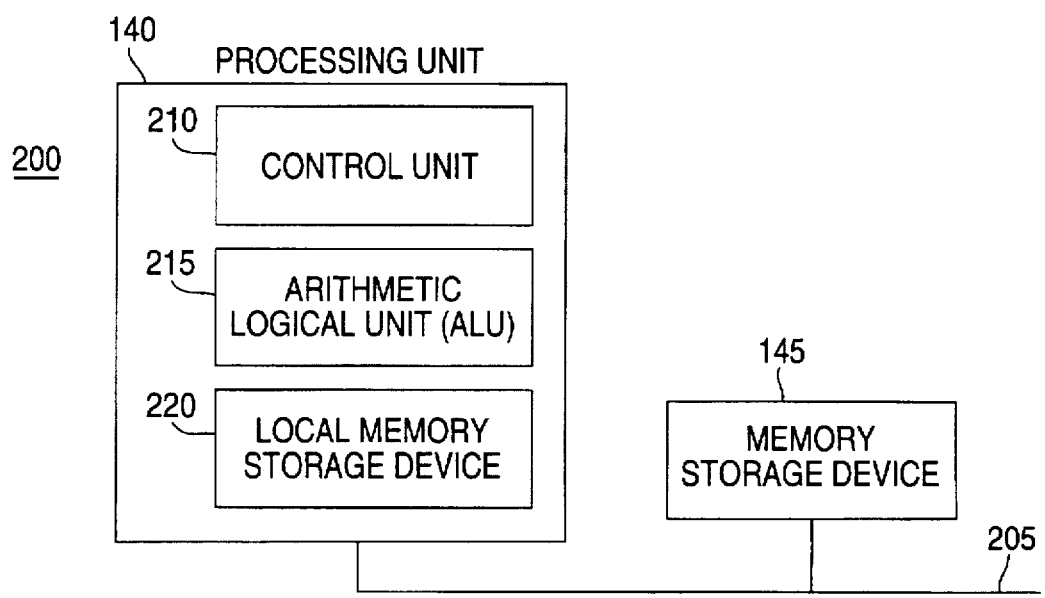
FIG. 2 illustrates a block diagram of an exemplary microprocessing circuit that may suitably be implemented in the processing system of FIG. 1.

FIG. 2 illustrates a block diagram of an exemplary microprocessing circuit 200 that may suitably be implemented in processing system 100 of FIG. 1. Microprocessing circuit 200 includes a processor 140 coupled via data bus 205 with a detached local memory 145. Memory 145 is operative to store data or instructions, which processor 140 is operative to retrieve and execute.

Processor 140 includes a control unit 210, an arithmetic and logic unit ("ALU") 215, and a internal memory 220 (e.g., stackable cache, a plurality of registers, etc.). Control unit 210 is suitably operative to fetch ones of the instructions from memory 145. ALU 215 is suitably operative to perform a plurality of operations, such as addition and Boolean AND, needed to carry out those instructions. Internal memory 220 is suitably operative to provide local high speed storage used to store temporary results and control information.

In alternate preferred embodiments, the above-identified processor circuitry, and in particular processor 140, may suitably be replaced by or combined with programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) or the like.

Figure 3:
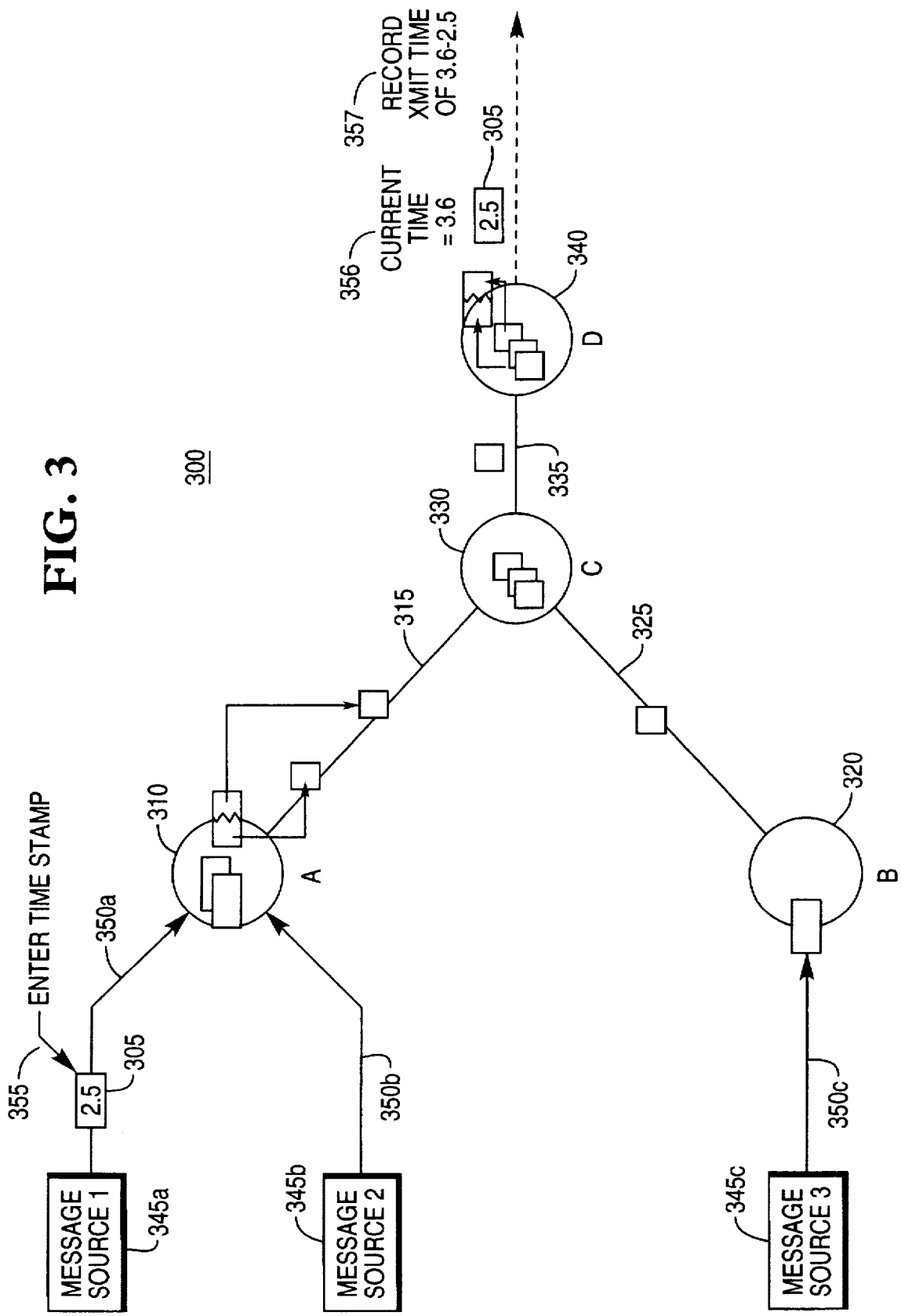
FIG. 3 illustrates a block diagram of an exemplary network model simulating transmission of a message between ones of a plurality of network elements in accordance with the principles of the present invention.
Figure 4A:
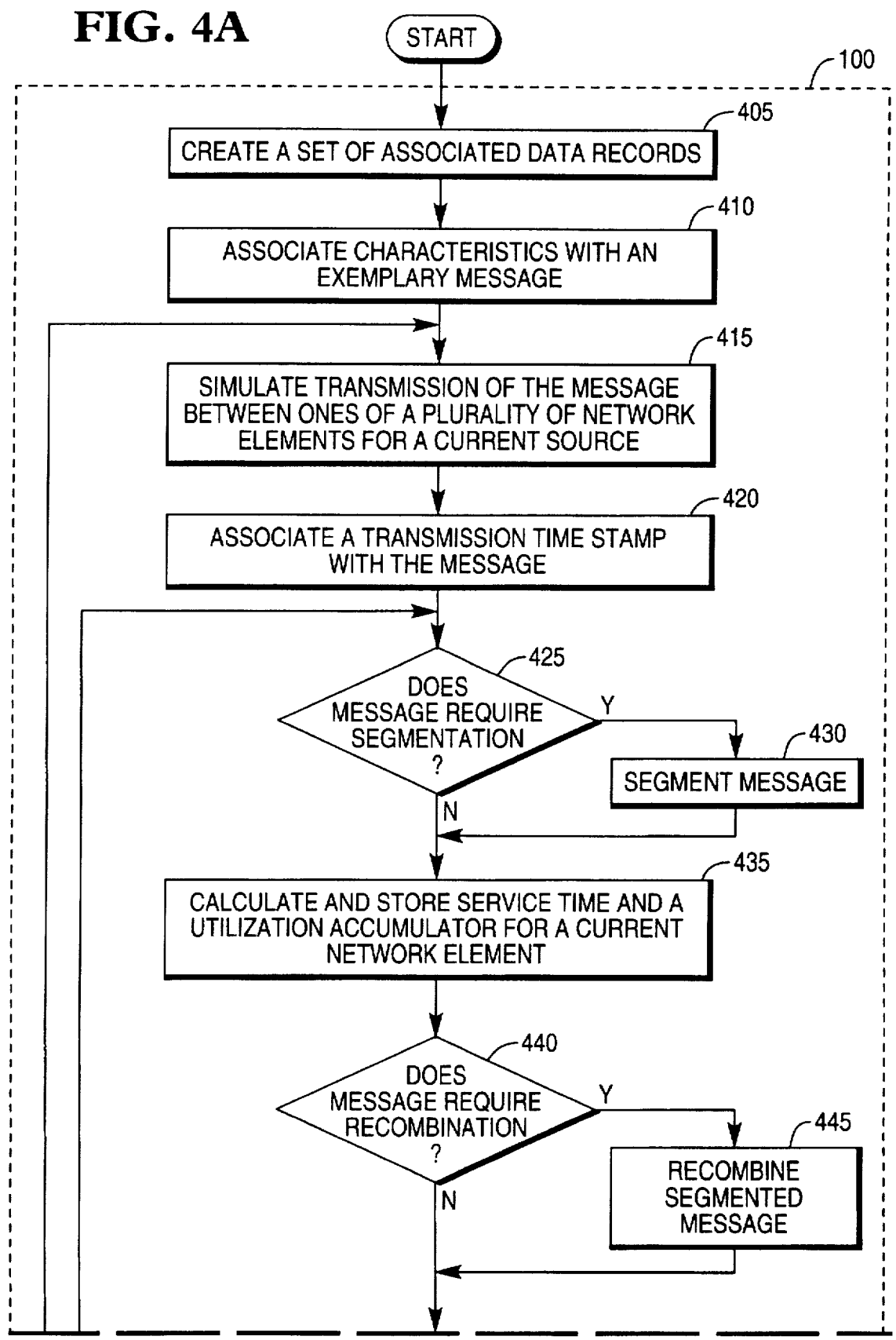
FIGS. 4A and 4B illustrates a flow diagram of an exemplary method for modeling a network in accordance with the principles of the present invention.
Figure 4B:
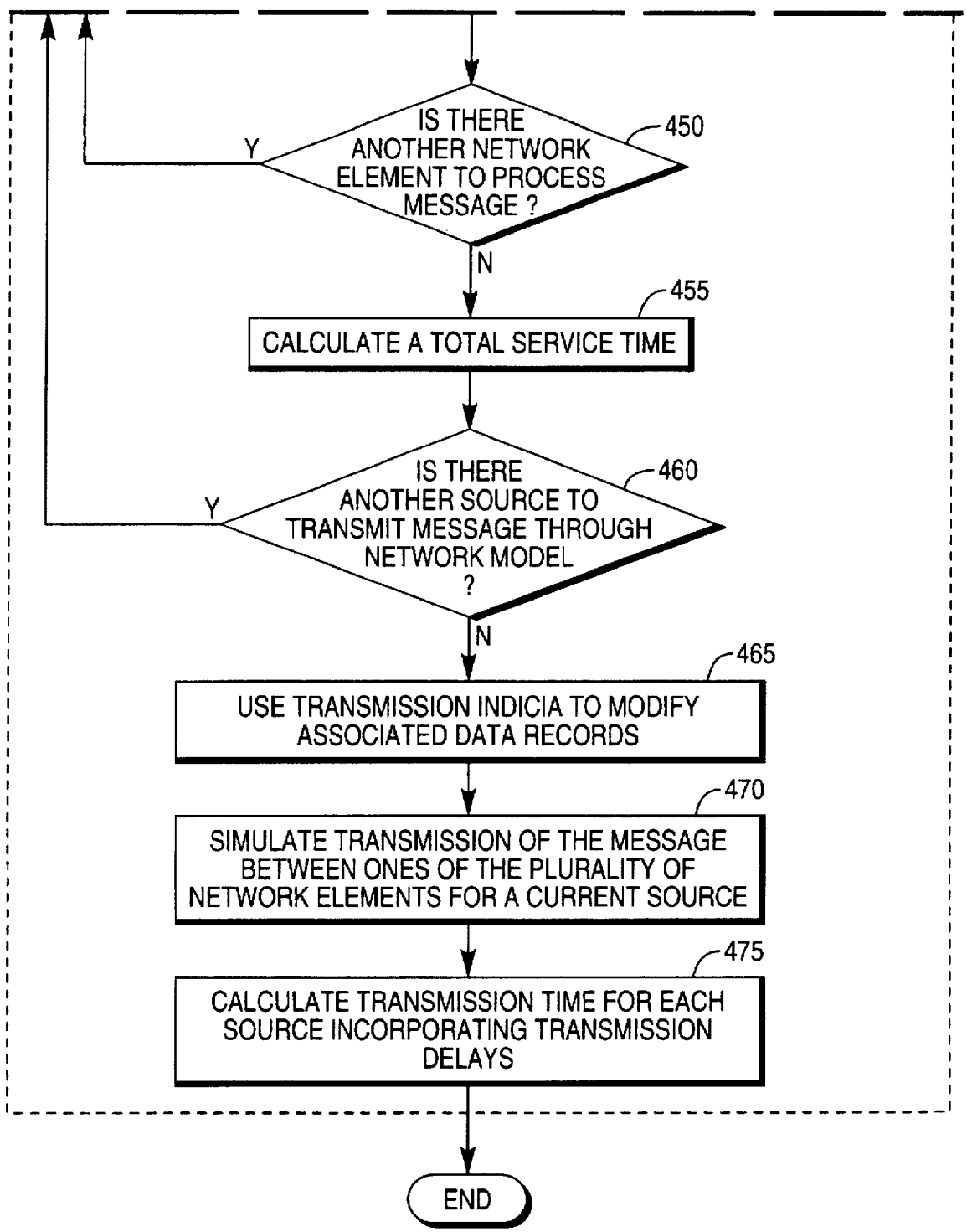

FIG. 3 illustrates a block diagram of an exemplary network model 300 simulating transmission of a message 305 between ones of a plurality of network elements 310 to 340 in accordance with the principles of the present invention. Network model 300 includes a plurality of associated network elements 310 to 340, wherein exemplary links 315, 325 and 335 operate to interconnect a plurality of exemplary nodes, routers, gateways, local area networks ("LANS"), bridges or the like 310, 320, 330 and 340 and to provide transmission paths between the same for the simulated transmission of exemplary message 305. Turning to FIG. 4, there is illustrated a flow diagram of an exemplary method for modeling a network in accordance with the principles of the present invention. For illustrative purposes only, the discussion of FIG. 4 is made with reference to FIGS. 1 and 3.

A user (not shown) interacts with processing system 100, possibly using keyboard 115 or some other conventional interface, to create a set of associated data records (input/output step 405). The set of associated data records are preferably stored in memory and are representative of network elements 310 through 340 within network model 300. The associated data records include one or more parameters representing characteristics of network elements 310 through 340, such as, network element speeds, capacities or any other suitable measurable characteristics of the same. As previously introduced, a preferred method for defining network elements, and interrelating the same to create the set of associated data records, is discussed in detail in U.S. patent application Ser. No. 08/641,599, which was incorporated by reference hereinabove. In a preferred embodiment, the associated data records further include multiplicity indicia for providing an abbreviated expression of quantities of ones of exemplary network elements 310 through 340 within network model 300. Processing system 100 may suitably be programmed to use the multiplicity indicia to display a symbolic representation of network model 300 on monitor 105. In another preferred embodiment, a set of message records may also suitably be stored in memory. The set of message records representing characteristics of one or more messages for simulating transmission of the same through a network model.

Message 305, in accordance with a particular protocol or standard, may suitably be segmented into a plurality of data packets for simulating transmission of the same through network 300. To that end, in a preferred embodiment of the invention, the user also associates certain measurable characteristics stored in the set of message records, such as message length or data packet size, for example, with message 305 (process step 410).

The user instructs the modeling task to begin simulation of the transmission of message 305 between ones of network elements 310 to 340 (process step 415). For illustrative purposes, the simulated transmission is of a single message. In alternate embodiments, the simulated transmission may suitably be of multiple messages or, alternatively, of a single data packet. Further, the various embodiments of the present invention may suitably be acknowledgment-based, or not, and the characteristics and impact of the same may also be considered.

In accordance with the illustrative embodiment, a current exemplary source 345a transmits, or generates, message 305 to network element 310 via a current exemplary source link 350a. Associated with current source 345 is a message transmission rate, "R," which is preferably stored in a globally accessible location in memory. The message transmission rate represents the rate at which current source 345 may suitably generate messages in an actual network.

A transmission time stamp 355 is generated and associated with message 305 (process step 420). Transmission time stamp 355 represents the time that message 305 was introduced into network model 300. The simulated transmission of message 305 is through one or more analogous paths within network model 300 that correspond to the actual network being modeled. In the illustrated embodiment, message 305 is received by network element 310, a determination is made as to whether message 305 should be segmented (decisional step 425). If the determination indicates that message 305 is to be segmented (YES branch of decisional step 425), then message 305 is segmented into a plurality of data packets 360a (process step 430). As message 305 is serviced at network element 310, a service time, t, and, preferably, a utilization accumulator, R*t, associated with network element 310, are stored in memory (process step 435). Service time, t, and utilization accumulator, R*t, are illustrative of transmission indicia in accordance with the principles of the present invention. Service time, t, at least in part, is path dependent. Preferably, a higher moment accumulator, $R*t^n$, for values of n>1, is calculated and stored.

This above-described process is repeated for each network element, 315, 330, 335 and 340 in the illustrative embodiment. Further, the plurality of data packets comprising message 305 are recombined into the same at network element 340 (YES branch of decisional step 440, process step 445). A determination is made as to whether any network elements remain to process message 305 (decisional step 450). In alternate embodiments, this determination may suitably be responsive to acknowledgment-based data packet transfers. If the determination indicates that no other network elements exist (YES branch of decisional step 450), then a total transmission time, or transmission time, st, for message 305 by current source 345a is calculated (process step 455). The total transmission time, st, represents the minimum time for a message generated by current source 345a to traverse network model 300. Note, that in the illustrated embodiment, no message generated by current source 345a may traverse network model 300 in less time, as the transmission is simulated when no other source is transmitting data packets through network model 300.

In accordance with the illustrated embodiment, the total transmission time, st, is preferably determined by comparing time stamp 355 with a current time stamp 356, the difference between the same equaling the total transmission time for message 305 through network model 300. This transmission time is an approximation, as the same remains unaffected by processing delays, such as queuing delays, for example, that would be experienced in both a "pure" simulation model, as well as the actual network being modeled.

A determination is made as to whether any other sources 345 remain to transmit messages through network model 300 (decisional step 460). If the determination indicates that there are no other sources 345 (YES branch of decisional step 460), then an average transmission time to traverse network model 300 is computed (process step 465). For ease of discussion, the exemplary description herein provided computes only the one-way transmission time for message 305 generated by each network source 345. In alternate embodiments modeling an acknowledgment-based transmission system, a round-trip response time (i.e., time period for message 305 generated by a particular source 345 to reach its destination and for the particular source 345 to receive an acknowledgment that the same was received from the receiving network element) is computed.

In the illustrated embodiment, transmission indicia, including all of utilization values associated with the network elements 310 through 340 are calculated and stored. The transmission indicia, which has been generated as a function of the above-described simulated transmission of message 305 within network model 300, is used in accordance with present invention to modify one or more parameters of the associated data records (process step 465). In the illustrated embodiment, the foregoing includes the generation of one or more transmission delays by calculation and, in particular, a queuing delay, D, associated with each network element 310 through 340. The queuing delay is preferably determined, at least in part, as a function of one or more of the utilization accumulators, such as the utilization values for links 315, 325 and 335.

The modeling task begins simulation of the transmission of message 305 between ones of network elements 310 to 340 (process step 470). Again, for illustrative purposes, the simulated transmission is of a single message. In alternate embodiments, the simulated transmission may suitably be of multiple messages or, alternatively, of a single data packet, and may suitably include segmentation as described hereinabove. Further, the various embodiments of the present invention may suitably be acknowledgment-based, or not, and the characteristics and impact of the same may also be considered. A current exemplary source 345a transmits message 305 to network element 310 via a current exemplary source link 350a. Transmission time stamp 355 is generated and associated with message 305. In the illustrated embodiment, message 305 is received by each of network elements 310, 315, 330, 335, and 340, as before. As message 305 traverses network model 300 it experiences mathematically computed delays, including at least queuing delay D at ones of the network elements. Message 305 is serviced at each one of the network elements within the transmission path. Preferably, queuing delay D is added to the service time, t. Upon completion of the traversal of network model 300, a current time stamp 356 is again generated. An average transmission time, T, is determined by subtracting time stamp 355 from current time stamp 356, which in the illustrative embodiment is equal to the summation of all services times, t, and transmission delays for all network elements traversed as message 305 passed through network model 300 (process step 475). This is process is repeated for each source 345, as before.

From the foregoing, it is apparent that the present invention provides systems and methods for computing the average transmission time, T, for either a data packet, a plurality of data packets, a message or a plurality of messages to traverse network model 300, wherein the average transmission time, T, includes an additional transmission delay representing the effect of other network traffic on a transmission.

Although the present invention and its advantages have been described in detail, those skilled in the art should understand that they can make various changes, substitutions and alterations herein without departing from the spirit and scope of the invention in its broadest form.

What is claimed is:

1. A processing system including a memory for storing a plurality of tasks, and a processing circuit, associated with said memory, for executing ones of said tasks, said processing system comprising:

a set of associated data records storable in said memory, said set of associated data records representing network elements within a network model, said associated data records including network element parameters of said network elements;

a modeling task storable in said memory and executable by said processing circuit to simulate transmission of data packets between ones of said network elements, said simulated transmission of said data packets within said network model performed, at least in part, as a function of said network element parameters; and a processing task storable in said memory and executable by said processing circuit to generate transmission indicia of said network elements as a function of said simulated transmission of said data packets within said network model, wherein said processing task modifies at least one selected network element parameter to thereby improve said simulated transmission of said data packets within said network model by said modeling task.

2. The processing system as set forth in claim 1 wherein associated ones of said data packets form a message and said modeling task further directs said processing circuit to determine an average transmission time for transmitting said message within said network model.

3. The processing system as set forth in claim 2 wherein said modeling task further directs said modeling task to segment a message into said data packets.

4. The processing system as set forth in claim 3 wherein said transmission indicia includes a service time associated with said simulated transmission of said data packets within said network model.

5. The processing system as set forth in claim 4 wherein processing task further directs said processing circuit to update a utilization accumulator as a function of said service time.

6. The processing system as set forth in claim 3 wherein said processing task further directs said processing circuit to combine said data packets to reform said message.

7. The processing system as set forth in claim 1 wherein associated ones of said data packets form a plurality of messages and said modeling task further directs said processing circuit to determine network processing data, said network processing data determined, at least in part, as a function of simulating transmission of said plurality of messages within said network model.

8. The processing system as set forth in claim 1 wherein ones of said associated data records include multiplicity indicia for providing an abbreviated expression of quantities of said network elements within said network model.

9. The processing system as set forth in claim 8 wherein said modeling task further directs said processing circuit to use said multiplicity indicia to display a symbolic representation of said network model on a display device.

10. The processing system as set forth in claim 1 wherein said processing task is selectable by said modeling task.

11. The processing system as set forth in claim 1 wherein a set of message records, storable in said memory, represents characteristics of ones of said data packets.

12. The processing system as set forth in claim 1 wherein ones of said parameters represent a queuing delay associated with ones of said network elements within said network model.

13. The processing system as set forth in claim 12 wherein said queuing delay is initially null.

14. The processing system as set forth in claim 1 further including a user interface, associated with said processing circuit, operative to generate control signals, said control signals usable for controlling said modeling task.

15. The processing system as set forth in claim 1 wherein said set of associated data records includes a root data record representing a root node within said network model.

16. A method for modeling a network, comprising the steps of:

storing a set of associated data records in a memory, said set of associated data records representing network elements within a network model, said associated data records including network element parameters of said network elements;

simulating transmission of data packets between ones of said network elements, said simulated transmission of said data packets within said network model performed, at least in part, as a function of said network element parameters;

generating transmission indicia of said network elements, as a function of said simulated transmission of said data packets within said network model; and modifying at least one of said network element parameters according to a value of at least one of said transmission indicia to thereby improve said simulated transmission of said data packets within said network model.

17. The method as set forth in claim 16 wherein associated ones of said data packets form a message and said method further comprises the step of determining an average transmission time for transmitting said message within said network model.

18. The method as set forth in claim 16 further comprising the step of segmenting a message into said data packets.

19. The method as set forth in claim 18 wherein said transmission indicia includes a service time associated with said simulated transmission of said data packets within said network model, and said method further includes the step of updating a utilization accumulator as a function of said service time.

20. The method as set forth in claim 18 further comprising the step of combining said data packets to reform said message.

21. The method as set forth in claim 16 wherein associated ones of said data packets form a plurality of messages and said method further comprises the steps of determining network processing data, said network processing data determined, at least in part, as a function of simulating transmission of said plurality of messages within said network model.

22. The method as set forth in claim 16 further comprising the step of associating multiplicity indicia with ones of said associated data records, said multiplicity indicia for providing an abbreviated expression of quantities of said network elements within said network model.

23. The method as set forth in claim 22 further comprising the step of using said multiplicity indicia to display a symbolic representation of said network model on a display device.

24. The method as set forth in claim 16 further comprising the step of storing a set of message records in said memory, said set of message records representing characteristics of ones of said data packets.

25. The method as set forth in claim 16 further comprising the step of representing a queuing delay as one of said network element parameters, said queuing delay associated with at least one of said network elements.

26. The method as set forth in claim 16 further comprising the step of using a user interface to generate control signals that enable a user to interact with said method.

27. The method as set forth in claim 16 further comprising the step of defining a root data record among said set of associated data records, said root data record representing a root node within said network model.

* * * * *